Sept 10, 1957    E. J. KREH, JR., ET AL    2,805,789
CONTAINER END STRUCTURE

Filed Nov. 17, 1953    2 Sheets-Sheet 1

$M\phi$ = Bending moment producted by deflection

Mo at this point tending to hold doughnut projection to shell.

INVENTORS
Edward J. Kreh, Jr.
& Conrad M. Ladd.
BY
Hymen Diamond
ATTORNEY

United States Patent Office 2,805,789
Patented Sept. 10, 1957

2,805,789
CONTAINER END STRUCTURE

Edward J. Kreh, Jr., Pittsburgh, Pa., and Conrad M. Ladd, Jackson, Mich., assignors to Westinghouse Electric Corporation, East Pittsburgh, Pa., a corporation of Pennsylvania Application November 17, 1953, Serial No. 392,692

4 Claims. (Cl. 220—67)

Our invention relates to the art of welding and has particular relation to the welding of gas or pressure-tight containers within which high pressure is developed.

While in its broader aspects our invention concerns itself with welding generally, in its specific aspects it involves seal welding and particularly the sealing of containers which are used in completely sealed systems containing corrosive or radioactive fluids under pressure. Seal welding is the art of sealing a container or the like by welding so that it is fluid tight. Seal welding is to be distinguished from structural welding. In the latter the principal object is to produce a weld which can withstand large mechanical forces; in seal welding the object is to produce a weld which may be subject to relatively small forces but must be fluid tight.

While the unit strength of a weld may be greater than that of the parent metal, the plastic flexibility (ductility) of the weld is not as high as that of the parent metal. A strong weld capable of withstanding large forces can be made but the low flexibility of such a weld would militate against its withstanding deflections so as to avoid leaks in a pressure tight system and such a weld would then not serve well as a seal weld. In situations in which large forces are developed and a seal weld is in addition required, it is then the practice so to construct the apparatus that the large forces are taken up by structural components such as a thread, a breech lock, or a shear ring while the seal weld is subjected only to relatively small forces.

Seal welds are used in sealed systems containing corrosive and/or radioactive fluids under pressure and at elevated temperatures in apparatus such as canned motors, valves, pumps, filters, strainers, instruments and other associated equipment. In such apparatus the need frequently arises to provide occasional access for servicing, cleaning, adjusting or inspecting equipment during periods of plant shutdown and it is desirable that the seal welds accommodate this requirement. Thus seal welds are used in hydraulic systems which may operate at high pressures and temperatures. In one situation to which our invention was applied, the pressure container is of the order of 2000 to 2500 pounds per square inch and the apparatus operates at temperatures from 70° F. to 600° F. The sealed container must in such apparatus be maintained entirely pressure tight under these severe conditions.

The pressure-tight container for the equipment just discussed may be composed of several different materials but stainless steel is usually preferred, particularly where corrosion and high temperature resistance is required. The container is preferably made up of several parts capable of disassembly which parts are held together by threaded, breech lock, shear ring or similar joints and by seal welds. While the seal welds are so disposed that the forces exerted on them are smaller than the forces on the other parts, it is still essential that the seal welds be capable of withstanding the pressure developed within the container and the strains arising from differential thermal expansion where high temperature operation is involved. The necessity for servicing the apparatus within the containers arises with reasonable frequency and for this purpose it is further desirable that ready facilities be available for disassembling the container.

It is, accordingly, broadly an object of our invention to provide welded assemblies capable of withstanding high pressures or differential thermal expansions.

Another object of our invention is to provide a seal welded container in which high pressure is to be developed and the welds of which shall be capable of withstanding the high pressure and flexure resulting from the pressure and from thermal effects on the joined members.

A further object of our invention is to provide a pressure-tight welded container capable of withstanding high pressure and also capable of being readily disassembled.

Reduced to simple terms physically, our invention in its specific aspects concerns itself with a seal welded assembly as just discussed which may consist of a casing for convenience considered as of circularly cylindrical shape or other surface of revolution having an opening of circular section in one of its bases within which a closure or plug is to be sealed. The opening may be provided with an internal thread which is to be engaged by a corresponding thread in the closure or by other means, such as those mentioned above, capable of positioning the parts and withstanding the pressure thrust. It is desirable that the shell and the closure be welded together pressure-tight and a pressure-tight peripheral weld of one type or another must then be provided between the parts at their junction.

Our invention arises from the realization that the maximum stress developed in the seal weld is that arising from the deflection, as a result of the high pressure, of the shell of the container with respect to the closure of its opening. This deflection may be substantial. Thus, in circularly cylindrical vessels designed in accordance with the code of the American Society for Mechanical Engineers, the permissible radial-deflection is of the order of .0005 inch per inch diameter of the container. The containers with which we have been concerned vary in diameter from approximately 2 inches to approximately 16, and thus the deflection varies between .001 inch and approximately .008 inch. This deflection produces stress in a peripheral weld of the type described above and the stress is substantial. In addition, we have realized that the cooperative threaded parts or other locking mechanisms provided for taking up the large component of the stress, such as end thrust, for example, because of tolerances tend to be displaced relative to each other under the pressure, and stress is produced in the seal weld because of this displacement. Under the stress produced by the deflection and the relative movement of the locking parts, the outermost fibers of the weld are compressed and the innermost fibers of the weld are subjected to tension. In addition, there is a circumferential stress perpendicular to the one just described. This circumferential stress is usually the smaller of the two.

A pressure-tight weld capable of withstanding this stress could conceivably be produced by depositing a sufficient number of weld beads along the joint between the shell and the closure. But this weld has the disadvantage that it presents difficulty in disassembly and in addition lacks flexibility. In addition, the deposit of a sufficient number of weld beads to withstand the stress results in distortion of the closure and the shell which in many cases results in malfunction of internal working parts.

The closure and the shell could also be joined by a so-called beam-type seal or weld. Such a seal is produced between concentric circular lips at the junction of the closure and shell, one lip being an integral part of the head and the other being an integral part of the shell. We have found, however, that such a beam-type seal is incapable of withstanding the stress developed by the pressure within containers of the type described above.

In accordance with our invention, we provide a container or a welded assembly in which there is a resilient pressure containing member or cushion between the region of the assembly where the deflection takes place and the weld. This cushion, to a large extent, absorbs the motion produced by the deflection and assures that the weld is subject only to a limited stress which is of a predictable character and which lies within the allowable stress of the material of the weld seam.

In accordance with the specific aspects of our invention, we provide a sealed container capable of withstanding high pressure or differential thermal expansions, which includes a shell having an opening therein and a closure for the opening with a resilient cushioning shell between adjacent surfaces of the container shell and closure. The cushioning shell is welded to either or both, of the surfaces, and the stress arising from the deflection is absorbed by the cushioning shell.

Specifically, the cushioning shell may be made up of projections or concave flanges joined respectively to the shell and closure; the surfaces of these respective projections which face each other being so disposed and so matched that when the closure is in the shell, the projections combine to form a unitary structure usually having the shape of a torus or other endless fistuliform or split tubular member with a hollow wall. This structure is so dimensioned, positioned and welded that there is the necessary resilient cushion between the parts that are deflected relative to each other.

The shell may also take other shapes. In accordance with one specific aspect of our invention the resilient cushion has the form of a segment of a sphere. The cushioning shell may also have the form of a hollow ring of semicircular cross section.

The novel features that we consider characteristic of our invention are set forth generally above. Our invention, however, both as to its organization and method of operation together with additional objects and advantages thereof will be understood from the following description of specific embodiments when read in connection with the accompanying drawings in which.

Figure 1:
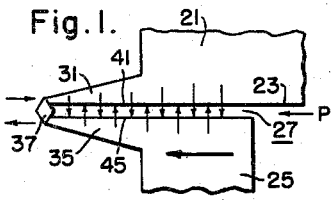
Figure 1 is a fragmentary cross-sectional view showing a weld of the beam type and presented for purposes of explaining our invention.

Fig. 1 shows portions of a shell 21 having an opening 23 therein and of a closure 25 for this opening. The space 27 between the closure and the shell at the boundary of the opening is shown exaggerated. The shell 21 has a projection 31 along the boundary of the opening 23 and the closure 25 has a corresponding projection 35. The shell 21 and closure 25 are welded together by a weld 37 of the beam type at the tips of the projections 31 and 35.

As shown in Fig. 1 the container formed by the shell 21 and the closure 25 is subjected to a pressure P. This pressure is present in the region between the shell 21 and the closure 25 and manifests itself as a pressure perpendicular to the face-to-face walls 41 and 45 of the closure 25 and the shell 21, as represented by the arrows.

Figure 2:
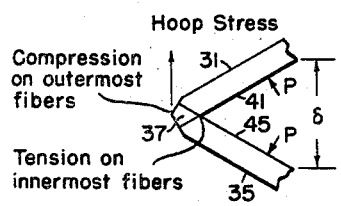
Fig. 2 is a fragmentary view in section exaggerated to show the effect of the deflection on a weld of the beam type.

In Fig. 2, the net effect of this pressure on the projections 31 and 35 of the closure and shell is shown. The pressure acting within the container below the projections 31 and 35 produces a deflection of the shell wall 41 relative to the closure wall 45 which is of magnitude $\delta$. The deflection $\delta$ produces bending and circumferential stresses in the weld 37, and in addition there is a bending stress arising from pressure forces (represented by arrows in Fig. 1) between the projections 31 and 35. The bending stress, which is the larger, may be represented by a vector in the plane of the drawing which extends radially either inwardly or outwardly from the axis of the shell and closure assuming each to be of circular section. In actual fact, the bending stress causes the outermost fibers of the weld 37 to be compressed and the innermost fibers of the weld to be tensioned. It is this stress which causes a weld of the beam type to fail when an attempt is made to weld a container of the type with which we are concerned. The circumferential stress is tangential to the circular elements of the weld and is not as important as the bending stress because it is normally substantially smaller.

The mechanical locking parts (not shown) which join the shell 21 and closure 25, because of the tolerance spacing between them, are also displaced relative to each other under the pressure and produce severe shear stress in the weld 37. Such displacement of the closure 25 is usually in the direction of the heavy lined arrow in Fig. 1.

Figure 3:
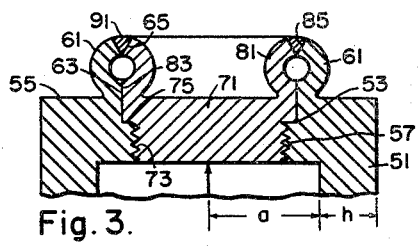
Fig. 3 is a view in section showing an embodiment of our invention.

In Fig. 3, a container in accordance with our invention is shown. This container comprises a shell 51 which may be of circularly cylindrical shape having an opening 53 of circular cross section in one of its bases 55. The inner portion 57 of the opening 53 which is threaded is of somewhat reduced area providing a shoulder near the center of the opening. At the outer end of the threaded portion, the opening has a shoulder. Around the boundary of the opening an annular projection 61 of hook shaped transverse cross section extends from the shell 51. The projection 61 is integral with the shell 51 and has a reentrant fillet in the region of the junction remote from the boundary of the opening 53. The face 63 of the projection 61 adjacent the boundary of the opening 53 is of cylindrical form and is coextensive with the opening. The remote face 65 of the projection is inclined to the cylindrical surface defined by the wall of the opening.

The container in accordance with our invention also includes a plug or closure 71 for the opening. This plug is provided near one end 73 with a thread engaging the thread 57 in the opening and capable of carrying the internal thrust load on plug 71. From the end of this thread, a flange 75 extends which is adapted to engage the shoulder of the opening 53. An annular hook-shaped projection 81 having a reentrant fillet extends around the periphery of the closure 71 and is integral therewith. At its face 83 adjacent the portion of the closure 71 which faces the projection 61 in the shell the projection 81 from the closure 71 is of cylindrical form and is coextensive with the adjacent walls of the closure and opening and thus matches the corresponding face 63 of the projection 61 from the shell. At its remote face 85, the projection is at an angle to the cylindrical surface defined by the wall of the closure 71 and shell 51 and when the closure is screwed into the opening in the shell, this angular surface 85 and the corresponding angular surface 65 of the projection 61 extending from the shell form a ring of wedge-shaped cross section. Within this ring, a filler metal 91 preferably, but not necessarily, of the material of the shell 51 and closure 71 may be deposited by arc welding, for example. The combination of the shell 51 and closure 71 are thus welded into a unitary container capable of withstanding the stress developed by high pressures.

The seal between the parts 61 and 81 may also be made by a weld of the fusion type; that is, by fusing the edges of the parts together without a filler under pressure or heat or both. Under such circumstances, the boundaries between the parts 61 and 81 at which the seal is made are parallel and not at an angle to each other.

The pressure P within the container shown in Fig. 3 produces an end thrust in the direction of the arrow in Fig. 3. This end thrust is taken up by the thread. Because of the play between the interlocking threads, the closure 71 is displaced by the end thrust axially with respect to the shell 51. The geometry and the dimensioning of the walls 61 and 81 is such that they provide a resilient cushion which takes up this displacement, and appreciable shear stress is not produced in the weld 91.

In carrying out tests to destruction of a container, such as is shown in Fig. 3, we have found that the displacement produced by end thrust may be as high as ¼ inch before fracture. The tests in which this displacement was observed were made with a container such as is shown in Fig. 3. The shell of this container was a hollow circular cylinder having an inside diameter of 6 9/16 inches. The mean diameter of the seal weld was about 7 inches. The inside radius of the body of the doughnut-shaped ring was .130 inch, and its outside diameter .225 inch.

Figure 5:
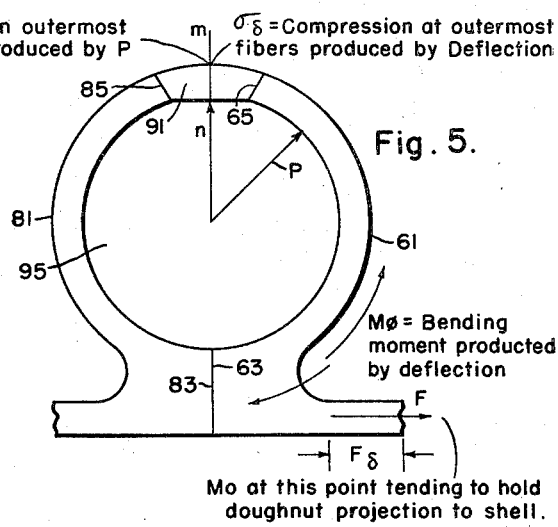
Fig. 5 is a fragmentary view in section showing the distribution of the moments, the stresses and the forces in the embodiment shown in Fig. 3.

The pressure P produced within the container also causes the wall of the shell 51 to be expanded or deflected with reference to the closure 71. This expansion produces a bending stress in the weld 91 which is a compression in the outermost fibers and a tension in the innermost fibers (Fig. 5). In addition, the pressure P is developed normal to the surface of the opening 95 between the projections 61 and 81. This pressure P causes the fibers of the weld 91 to be tensioned (Fig. 5), and thus acts opposite to the deflection stress on the outermost fibers. In addition, the portions of the projections 61 and 81 between the shell 51 and the weld 91 constitute a resilient cushion which absorbs the deflection with low levels of stress.

We have found that a container of the type shown in Fig. 3 is capable of withstanding the stress developed by the pressures involved in the use of such containers for the purposes previously indicated. Our tests indicate that a weld 91 of the type just described sealing a container for a motor can be deformed as high as ¼ inch axially before fracture occurs.

In the practice of our invention, we have found that it is important that the weld lips 65 and 85, which define the weld ring 91 of wedge-shaped section, must be carefully machined. This is a costly item. But in the light of the fact that the weld 91 is essential to the operation of the apparatus, this cost is of secondary importance. In addition, pattern machining methods are available, the use of which would lead to the reduction of the cost of the machining of the lips 65 and 85 to a nominal figure.

Figure 4:
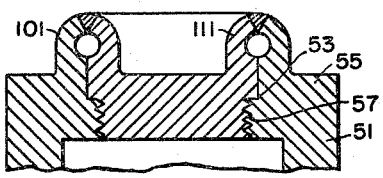
Fig. 4 is a view in section showing a modification of the embodiment shown in Fig. 3.

In the container shown in Fig. 3 the fillets at which the projections 61 and 81 are joined to the shell 51 and closure 71 are reentrant. In the Fig. 4 modification, a container is shown in which the fillets on the analogous projections 101 and 111 are of the non-reentrant type. Otherwise, the containers shown in Fig. 3 and Fig. 4 are similar. We have found that this modification, while superior from a manufacturing standpoint to the one shown in Fig. 3, is not as satisfactory from an operational standpoint.

Figure 6:
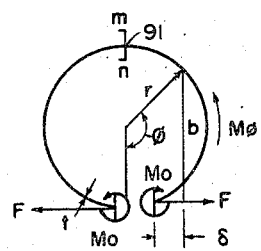
Fig. 6 is a diagrammatic view showing the relationship between the forces and the moments in the embodiment shown in Fig. 3.

For the purpose of giving a clear understanding of our invention, it may be well at this point to present a mathematical analysis of a seal in accordance with our invention, and for this purpose, the seal shown in Fig. 3 is selected. The forces and moments impressed and the stresses developed in a section of small cross section of a torus-shaped container, such as is shown in Fig. 3, are presented in Fig. 5. For the purpose of the mathematical analysis, the diagram shown in Fig. 6 is presented.

The physical situation involved at the joint is that the pressure P within the container causes the shell to separate by a small distance from the closure. Since the projections 61 and 81 are integral with the shell 51 and closure 71, respectively, over a substantial area and not along an approximate line, the bending at the junctions between the projections 61 and 81 and the shell 51 and closure 71, respectively, is resisted, but the portion of the projection 61 extending from the shell 51 is deflected outward producing stresses in the weld. In making the following analysis, a transverse section of the torus 61—81 will be considered. It is assumed that this section has a depth of unity perpendicular to the plane of the drawing. This section may then be regarded as a hoop of unity thickness at the end $mn$ of which there is a weld. The other end corresponding to the region where the projection 61 joins the shell 51 is deflected by a distance $\delta$.

It is assumed that the stiffness of the torus 61—81 is negligible with respect to that of the shell 51, and thus the radial deformation of the shell 51 is produced only by the pressure P and is not restricted by the torus 61—81. It is also apparent that in the weld 91, the stress which arises from the pressure is to be added algebraically to the stress which arises from the deflection. It is further apparent that the stress in the torus 61—81 which arises from the pressure is uniform throughout the thickness of the wall of the torus.

With the above-described circumstances in mind, let:

$M\phi$ = the moment caused by the deflection in the torus.
$F$ = the force producing the deflection in the torus.
$r$ = the mean radius of the transverse cross section of the torus.
$\phi$ = angle between an axis through the section of the projections 61—81 about which the section of the torus is symmetric and any point along the cross section of the projections.
$t$ = the width of the cross section of the projections.
$b$ = the moment arm through which force F acts with respect to any point on the cross section of the projections.
$U$ = the energy developed by the stressing of the cross section of the projections having unity depth as assumed.
$E$ = the modulous of elasticity of the weld material.
$I$ = the moment of inertia of the disc consisting of the cross section of the projections and having unity depth.
$\sigma\delta$ = the stress developed in the weld 91 by reason of the deflection.
$\sigma_P$ = the stress developed in the weld 91 by reason of the pressure P.
$a$ = the inside radius of the shell 51.
$h$ = the wall thickness of the shell 51.

The moment equation is:

(1) $\qquad M\phi = Mo - Fb = Mo - Fr(1-\cos\phi)$ since $$b = r(1-\cos\phi)$$

The energy equation is:

(2) $$U = \frac{1}{2} \int \frac{M_\phi^2 ds}{EI}$$

Since the rotation at section $mn$ is zero (3) $$\frac{\partial U}{\partial M_0} = 0 = \frac{1}{2}\int_0^\pi 2M_\phi \left(\frac{dM_\phi}{dM_0}\right)\frac{ds}{EI}$$

but
$$ds = r\,d\phi$$

and
$$\frac{dM_\phi}{dM_0} = 1$$

since F, the impressed force, is not a function of $M_\phi$. Then $$0 = \int_0^\pi [M_0 - Fr(1-\cos\phi)]\frac{r\,d\phi}{EI}$$

$$\int_0^\pi \frac{M_0 r\,d\phi}{EI} = \int_0^\pi \frac{Fr^2}{EI}(1-\cos\phi)\,d\phi$$

$$M_0 r\pi = Fr^2\pi$$

(4) $$\therefore M_0 = Fr$$

(5) $$\frac{\partial U}{\partial F} = \frac{\delta}{2} = \int_0^\pi M_\phi\left(\frac{dM_\phi}{dF}\right)\frac{r\,d\phi}{EI}$$

but
$$\frac{dM_\phi}{dF} = \frac{dM_0}{dF} = \frac{d[Fr(1-1+\cos\phi)]}{dF}$$
$$= r\cos\phi$$

hence
$$\frac{\delta}{2} = \int_0^\pi \frac{Fr^3\cos^2\phi\,d\phi}{EI} = \frac{Fr^3}{EI}\frac{\pi}{2}$$

and (6) $$\delta = \frac{\pi Fr^3}{EI}$$

Equation 6 gives the relationship between the deflection and the impressed force F arising from the pressure P.

We can in turn find the expression for the relationship between deflection and the stress arising from deflection as follows:

$$\sigma_\delta = \frac{Mc}{I}$$

Where M is maximum moment at section $mn$ and equals $Fr$ and $$c = t/2$$

From (6)

$$M = Fr = \frac{EI\delta}{\pi r^2}$$

(7) $$\therefore \sigma_\delta = \frac{EI\delta}{\pi r^2}\frac{c}{I} = \frac{EC\delta}{\pi r^2} = \left(\frac{Et}{2\pi r^2}\right)\delta$$

Now for a thin walled circular, cylindrical shell, $\delta$ can be computed from the geometry of the shell and is $$\delta = \frac{Pa^2}{hE}$$

Substituting in Equation 7:

(8) $$\sigma_\delta = \left(\frac{Et}{2\pi r^2}\right)\frac{Pa^2}{hE}$$

$$\sigma_\delta = \frac{Pa^2}{2\pi h}\left(\frac{1}{r}\right)\left(\frac{1}{r/t}\right) = \frac{C_1 P}{r\left(\frac{r}{t}\right)}$$

Where
$$C_1 = \frac{a^2}{2\pi h}$$

To find $\sigma_P$ consider the section of the seal as though it were a section of pipe, then:

(9) $$\sigma_P = \frac{Pr}{t} = C_2\left(\frac{r}{t}\right)$$

Where
$$C_2 = P$$

If a limiting stress $\sigma_e$ is set up then the equation of limitation on the design is:

(10) $$\frac{C_1 P}{\frac{r}{t}(r)} + P\left(\frac{r}{t}\right) = \sigma_e$$

where the maximum occurs on the inside wall.

This can be written in more convenient form as:

(11) $$r\left(\frac{r}{t}\right)^2 - \frac{\sigma_e}{P}\left(\frac{r}{t}\right)r + C_1 = 0 = f\left(r,\frac{r}{t}\right)$$

(12) $$\frac{\partial\left[(r)\left(\frac{r}{t}\right)\right]}{\partial\left(\frac{r}{t}\right)} = 2r\left(\frac{r}{t}\right) - \frac{\sigma_e}{P}r = 0$$

The function
$$f\left(r,\frac{r}{t}\right)$$

is a minimum then for $$\left(\frac{r}{t}\right) = \frac{\sigma_e}{2P}$$

Figure 7:
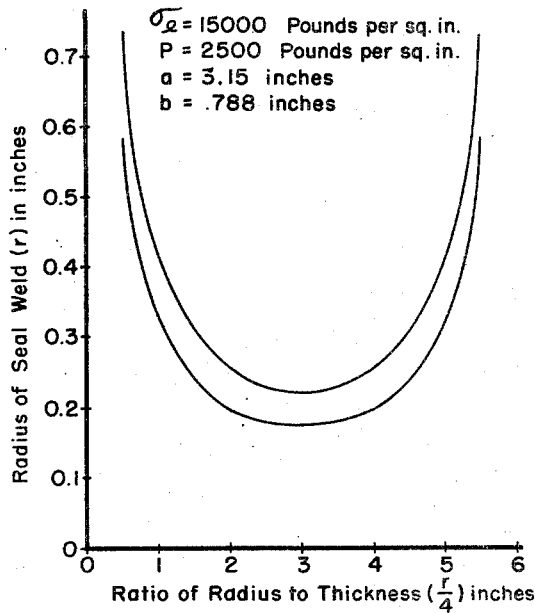
Fig. 7 is a graph derived from an analysis of the diagram shown in Fig. 6 and useful in the practice of our invention.

In Fig. 7, plots of $r$ as a function of $$\left(\frac{r}{t}\right)$$

are presented for the case where $M_0$ is assumed to be zero; (that is, to correspond to a situation in which the torus-shaped projections 61 and 81 make only a geometric line contact with the shell 51 and closure 71 and are not restricted against rotation at this junction), and for the case in which an approximate magnitude for $M_0$ is determined. The lower curve corresponds to the Equation 11 assuming that $M_0$ is zero and the upper curve corresponds to the Equation 11, assuming $M_0$ has approximate magnitude ($M_0 = Fr$). "r" is plotted vertically in inches and the ratio of the mean radius to the width $$\left(\frac{r}{t}\right)$$

of the section is plotted horizontally for the magnitudes appearing on Fig. 7 which corresponds to an actual situation encountered in the practice of our invention. This curve has a minimum for $r$=about 0.2 inch $$\left(\frac{r}{t}\right) = 3$$

To avoid bulkiness, it is desirable that the mean radius be as small as practicable and the curves shown in Fig. 7 present a facility for accomplishing this object. Curves similar to that shown in Fig. 7 can be plotted for each situation and in each case, the radius of the section and the ratio of the radius to the thickness can be made to correspond to the region of the minimum of the curves.

Preferably, the upper curve which corresponds to the situation in which the end moment $M_o$ has been taken into account should be adopted.

The above derivation of $\sigma_\delta$ and $\sigma_P$ are based on a thin section for which it may be assumed that the ratio $r/t$ is low, and there is a linear stress distribution across the section $mn$. Where the thickness $(t)$ becomes large with respect to the radius $(r)$, the following more accurate analysis applies. In this case $\sigma$ is not equal to $$\frac{Mc}{I}$$

but rather

(13) $$\sigma_\delta = \frac{Mh_1}{Aer}$$

where $e$ is the distance from the center of the section to the centroid which is approximately $$\frac{t^2}{12r}$$

for a rectangular section in bending $$h_1 = \frac{t}{2} - e$$

$A = \text{area} = t$ (for unity thickness)

(14) Then $$\sigma_\delta = \frac{Fr\left[\frac{t}{2} - \frac{t^2}{12r}\right]}{t(t^2/12r)(r)} = \frac{F}{t^2}(6r - t)$$

But:

$$F = \frac{\delta EI}{\pi r^3} \text{ from } (6) = \frac{Pa^2}{hE} \cdot \frac{EI}{\pi r^3} = \frac{Pa^2 t^3}{h 12 \pi r^3}$$

(15) Therefore $$\sigma_\delta = \frac{Pa^2}{h} \cdot \frac{t^3}{12\pi r^3} \cdot \frac{1}{t^2}(6r - t)$$

$$= \frac{Pa^2}{12\pi h r \left(\frac{r}{t}\right)^2}\left[6\left(\frac{r}{t}\right) - 1\right]$$

$$= \frac{PC_1}{\left(6r\frac{r}{t}\right)^2}\left[6\left(\frac{r}{t}\right) - 1\right] \text{ where } C_1 = \frac{a^2}{2\pi h}$$

$\sigma_P$ also is not equal to $$\frac{Pr}{t}$$

but rather

(16) $$\sigma_P = P\left[\frac{r}{t} + \frac{1}{4\left(\frac{r}{t}\right)}\right]$$

Finally the total stress at the inner wall arising from the pressure and deflection:

$$\text{Total} = \sigma_\delta + \sigma_P$$

(17) $$= P\left[\frac{C_1\left(\frac{r}{t} - \frac{1}{6}\right)}{r(r/t)^2} + \frac{r}{t} + \frac{1}{r(r/t)}\right]$$

This relationship may be as evaluated for a limiting stress in the same manner as Equation 11 where rigor is demanded.

It also appears desirable to consider the circumferential stress, that is the stress tangential to any circular portion of the weld 91 extended around the torus-shaped projections 61—81. When the shell 51 is deflected a distance $\delta$ as shown in Fig. 5, it produces a circumferential strain equal to $\delta/R_c$ where $R_c$ is the distance of the shell from the center of the shell 51 and closure 71. The weld 91 is symmetrical about the axis of the section (61—81) which passes centrally through it and therefore the circumferential stress $\sigma_w$ developed at the two extremes of the weld 91 is equal to ½ the circumferential stress developed at the shell since the deflection of the extremes of the weld is only equal to $\delta/2$. The circumferential stress at the weld then is equal to $\delta E/2R$ where $R$ is the distance from the weld to the axis of a shell 51 and the closure 71. $\sigma_w$ is smaller than the bending stress and thus the above analysis of the bending stress leads to the proper dimensioning of the seal for a limiting stress.

The above analysis does not cover the shear stress which could be produced by the axial displacement of the closure 71 relative to the shell 51 which in prior art seal welds is large. The flexible cushion of our seal weld is so made as to take up the axial displacement without producing substantial shear. That this construction is effective we have established by making and testing vessels in accordance with our invention.

Figure 8:
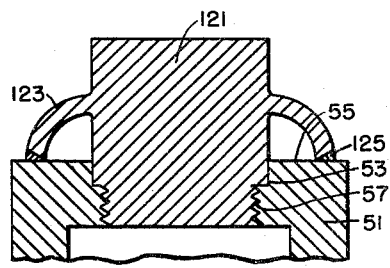
Fig. 8 is a view in section of a modified embodiment of our invention.
Figure 9:
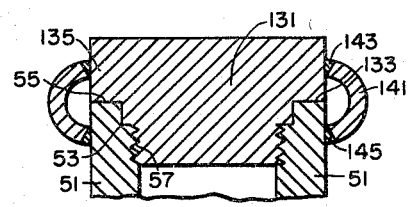
Fig. 9 is a view in section of a further modified embodiment of our invention.
Figure 10:
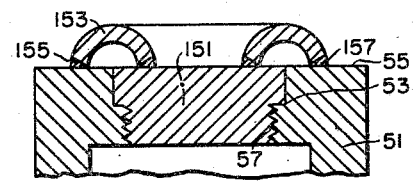
Fig. 10 is a view in section of still another modified embodiment of our invention.

The seal welded assembly in accordance with our invention can be constructed in other ways than those embodied in our Figs. 3 and 4 modifications. Several different structures are shown in Figs. 8, 9, and 10. In the modifications shown in each of these, the resilient cushion is in the form of a shell extending between a portion of the surface of the closure and a portion of the surface of the shell and welded to either or both of the surfaces.

In the modifications shown in Fig. 8, the closure 121 extends beyond the top of the shell 51 and its surface is coextensive with the surface of the closure within the opening 53. The cushioning shell 123 in this case is integral with the closure 121 and preferably has the form of a torus, the longitudinal section of which has the form of two diametrically opposite quadrants of a circle symmetrical with respect to the axis of the shell 51 and closure 121. The shell 123 is sealed to the base 55 of shell 51 by a ring weld 125.

In the container shown in Fig. 9, the closure 131 has a flange 133 where it engages the shell 51 and has an extension 135 which is coextensive with the outer wall of the shell 51. In this case, the cushioning shell is in the form of a hollow ring 141, the transverse section of which is a hollow semicircular disc and this ring is joined both to the surface of the closure 131 and to the surface of the shell 51 by welds 143 and 145.

In the container shown in Fig. 10, the surface of the closure 151 is flush with the surface of the container shell 51 and the cushioning shell is in the form of a ring 153 of hollow semicircular transverse cross section, the edges of which are joined to the closure surface and to the adjacent surfaces of the shell by welds 155 and 157.

Figure 11:
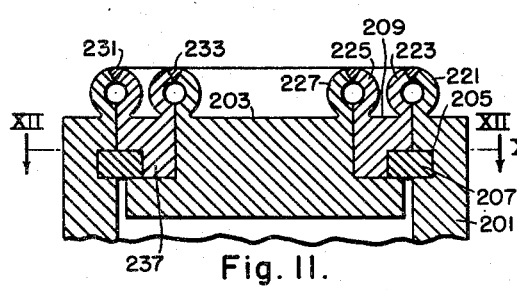
Fig. 11 is a view in longitudinal section of a further modification of our invention.
Figure 12:
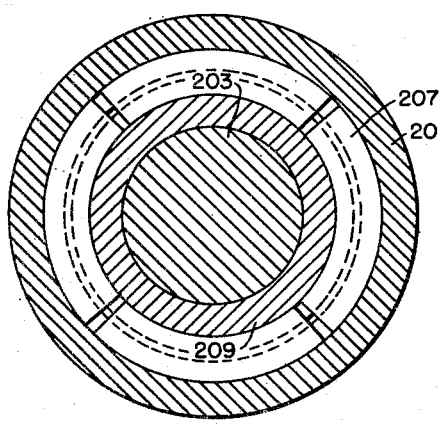
Fig. 12 is a view in transverse section taken along the line XII—XII of the modification shown in Fig. 11.

In the modification shown in Figs. 11 and 12, there is a shear-ring locking mechanism between the shell 201 and the closure 203. In this case, the shell 201 has an annular groove 205 near its opening. The locking mechanism includes a plurality of blocks 207 in the form of arcs of a flat circular ring which are dimensioned to fit closely in the grooves 205 and a cooperating retaining ring 209 for the blocks. Hook-shaped projections 221, 223, 225 and 227 extend, respectively, around the rim of the opening in the shell 201, the adjoining rim of the retaining ring 209, the opposite rim of the ring 209 and the closure 203. These projections 221, 223, 225 and 227 have a structure and are dimensioned similar to the projections of the Fig. 3 modification and are sealed by welds 231 and 233 similarly to the weld 91 of Fig. 3.

In assembling the container shown in Figs. 11 and 12, the closure 203 is positioned in the opening of the shell 201. The blocks 207 are then disposed in the flange 235 of the closure 203. The ring 209 is now disposed between the closure 203 and shell 201, so that the end 237 of this ring causes the blocks 207 to slide into the slot 205. The seals 231 and 233 are then welded. The assembly can be conveniently carried out with the proper jigs and fixtures.

Figure 13:
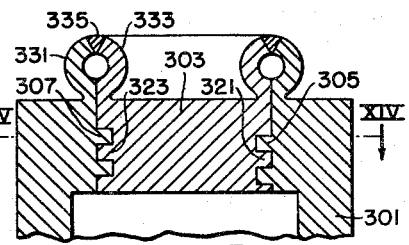
Fig. 13 is a view in longitudinal section of a still further modification of our invention.
Figure 14:
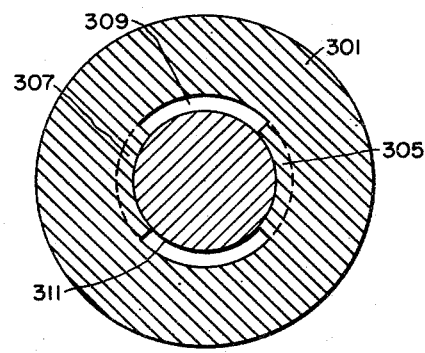
Fig. 14 is a view in transverse section taken along line XIV—XIV of the modification shown in Fig. 13.

In the modification shown in Figs. 13 and 14, there is a breech lock mechanism between the shell 301 and the closure 303. In this case, the shell 301 has threads 305 and 307 extending over diametrically opposite arcs of somewhat less than 90° of the internal surface of the opening. The arcs 309 and 311 of the internal surface between the threaded arcs 305 and 307 are machined out to the roots of the threads. The closure has corresponding threads 321 and 323 over opposite arcs of somewhat less than 90°, and the arcuate surfaces between the threads 321 and 323 are machined out to the roots of the threads 321 and 323. Hook-shaped projections 331 and 333 similar to those in the Fig. 3 modification extend from the shell 301 and the closure 303. The closure 303 is sealed in the shell 301 by a weld 335 similar to that in the Fig. 3 modification.

In assembling this container, the closure 303 is slipped into the opening in the shell 301, so that its threaded arcs 321 and 323 slide into the machined out arcs 309 and 311 of the shell, and the threads 305 and 307 of the shell slide into the machined out arcs of the closure. The closure is then turned through 90°, so that the threads 305 and 307 engage the threads 321 and 323 and the closure is thus locked in position. Thereafter, seal weld 335 is made.

The modification shown in Figs. 13 and 14 may be changed in a number of respects. For example, the threaded arcs may be substantially smaller than 90°, or there may be more than one set of diametrically opposite arcs, each substantially less than 90°.

We have here disclosed a welded assembly capable of withstanding high stress, and this assembly includes a resilient cushion between the region in which the deflection is produced by the pressure and the weld which, to a large extent, absorbs the stress. Our work with our weld has established that in actual practice this weld is capable of withstanding the pressures of 2500 pounds per square inch and even higher pressures. In fact tests carried to destruction indicate that our containers are capable of withstanding pressures up to 7500 pounds per square inch. These are unusual pressures for vessels of the dimensions involved in our work which may have an inside diameter as high as 16 inches or higher, a wall thickness of the order of ¾" to 1½" and a height as high as four feet or higher.

While we have shown and described certain specific embodiments of our invention, many modifications thereof are possible. Our invention, therefore, is not to be restricted except insofar as necessitated by the prior art.

We claim as our invention:

1. A sealed container in which high pressure is developed comprising, a container shell having an opening of circular transverse section therein and a closure of circular transverse section for said opening, said shell and closure having cooperative locking means and said closure being welded gas tight to said shell, the stress produced by said pressure being impressed on said weld through a resilient cushion having circular symmetry about the axes of said opening and closure, said cushion consisting of a first continuous projection extending circumferentially around said opening adjacent the opening and a second cooperative continuous projection extending around the periphery of the closure, said first projection being reentrant in the region where it joins said shell and said second projection being reentrant in the region where it joins said closure, said projections combining to form a hollow ring, the transverse section of which made by a plane containing the axis of said closure and opening is substantially an annulus and the weld in said ring is disposed between said projections in the region of said ring which is most remote from the area where said projections extend from said shell and closure.

2. A sealed container in which high pressure is developed comprising, a container shell having an opening of circular transverse section therein and a closure of circular transverse section for said opening, said shell and closure having cooperative locking means and said closure being welded gas tight to said shell, the stress produced by said pressure being impressed on said weld through a resilient cushion having circular symmetry about the axes of said opening and closure, said cushion consisting of a first continuous projection extending circumferentially around said opening adjacent the opening and a second cooperative continuous projection extending around the periphery of the closure, said first projection being reentrant in the region where it joins said shell and said second projection being reentrant in the region where is joins said closure, said projections combining to form a hollow ring, the transverse section of which made by a plane containing the axis of said closure and opening is substantially an annulus and the weld in said ring is disposed between said projections in the region of said ring which is most remote from the area where said projections extend from said shell and closure, the ratio of the mean radius of said ring to the thickness of the wall of said ring being of the order given by the value of $$\frac{r}{t}$$

at which $r$ is a minimum in the equation $$r\left(\frac{r}{t}\right)^2 - \frac{\sigma_t}{t}\left(\frac{r}{t}\right)^r + C_1 = 0$$

where $r$ = the mean radius of said ring
$t$ = thickness of said ring
$\sigma_t$ = the maximum permissible stress
$p$ = internal pressure
$C_1 = \dfrac{a^2}{2\pi h}$ $a$ being the inside radius of said shell
$h$ being the wall thickness of said shell.

3. A sealed container wherein high pressure is developed, said container comprising a shell member having an opening therein; a closure shaped to conform to said opening and inserted therein; means for locking said closure in said opening; and resilient welded means for sealing said closure to said shell member, said last-mentioned means including a first continuous projection extending circumferentially around said opening and adjacent thereto and a second continuous projection extending adjacently around the periphery of said closure, said first projection being reentrant in the region where it joins said shell member and said second projection being reentrant in the region where it joins said closure, said projections cooperatively combining to form an endless hollow fistuliform member disposed to enclose the junction between said shell member and said closure, and said projections being sealingly welded in a region of said fistuliform member wherein said weld is removed from the reentrant connections of said fistuliform member with said closure and with said shell member, respectively.

4. A sealed container wherein high pressure is developed, said container comprising a shell member having an opening therein; a closure shaped to conform to said opening and inserted therein; means for locking said closure in said opening; and resilient sealing means joined respectively to said shell member and to said closure and bridging the junction therebetween, said last-mentioned means including an endless, longitudinally split tubular member coextending adjacently with the periphery of said opening and being reentrant in the regions adjacent each side of said split, said reentrant regions straddling said junction and being joined to said shell member and to said closure, respectively, said reentrant regions having respective portions thereof abutting one another in the area of said split.

References Cited in the file of this patent

UNITED STATES PATENTS

| | | |
|---|---|---|
| 1,902,494 | Emmet | Mar. 21, 1933 |
| 1,958,582 | Kerr et al. | May 15, 1934 |
| 2,128,093 | James | Aug. 23, 1938 |
| 2,320,941 | Litton | June 1, 1943 |
| 2,352,038 | Tolke | June 20, 1944 |
| 2,473,555 | Weiss | June 21, 1949 |
| 2,610,820 | Markel et al. | Sept. 16, 1952 |
| 2,640,624 | Madaras | June 2, 1953 |
| 2,697,770 | Carpenter | Dec. 21, 1954 |
| 2,711,266 | Kopp | June 21, 1955 |

FOREIGN PATENTS

| | | |
|---|---|---|
| 281,485 | Italy | Jan. 14, 1931 |
| 52,258 | Denmark | Sept. 22, 1936 |
| 547,642 | Great Britain | Sept. 4, 1942 |
| 698,426 | Great Britain | Oct. 14, 1953 |
| 896,585 | Germany | Nov. 12, 1953 |
| 963,387 | France | Dec. 26, 1949 |

OTHER REFERENCES

V. D. I. Zeitschrift Bd. 84, No. 17, April 27, 1940, page 281.